United States Patent Office 3,270,016
Patented August 30, 1966

3,270,016
ARYL-1,3,5-TRIAZINES
Max Duennenberger, Frenkendorf, Basel-Land, Hans Rudolf Biland, Basel, and Christian Luethi, Munchenstein, Switzerland, assignors to Ciba Limited, Basel, Switzerland, a Swiss company
No Drawing. Filed Jan. 17, 1964, Ser. No. 340,117
Claims priority, application Switzerland, Jan. 25, 1963, 932/63
3 Claims. (Cl. 260—248)

The present invention provides new, valuable aryl-1:3:5-triazines of the general formula (1) 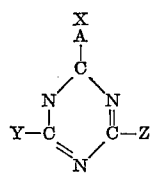

where A represents —NH— or a group =N—Q (where Q is an aliphatic radical bound through a carbon atom to the nitrogen atom), X represents an aliphatic radical bound through a carbon atom to A or a naphthalene, or preferably a benzene, radical bound through a cyclic carbon atom to A, or if A=—NH—, it may represent a hydrogen atom; Y stands for a naphthalene, or preferably benzene, radical bound through a cyclic carbon atom directly to the triazine ring, and Z stands for a halogen atom, especially chlorine, or a radical Y, at least one of the symbols X, Y and Z representing a napthalene, or especially a benzene, radical which contains a hydroxyl group in vicinal position to the bond to A or in vicinal position to the bond to the triazine ring.

The naphthalene, and especially benzene, radicals that contain in vicinal position to the direct bond to the triazine ring, or in vicinal position to the bond to A, a hydroxyl group, as well as the naphthalene, or especially benzene, radicals that do not contain a hydroxyl group in the said position may contain further substituents, for example chlorine atoms, phenyl, alkylphenyl or phenylalkyl groups such as benzyl or alkyl groups having, for example, 1 to 8 carbon atoms, and especially hydroxyl groups or etherified hydroxyl group, for example hydroxyalkoxy groups or etherified hydroxyl group, for example hydroxyalkoxy groups such as —O—CH$_2$—CH$_2$—OH, —O—CH$_2$—CH$_2$—CH$_2$OH or

—O—CH$_2$—CHOH—CH$_2$OH alkenyloxy groups such as allyloxy, phenylalkoxy groups such as benzyloxy, 2:3-epoxy-propoxy groups, carboxyalkoxy groups such as —O—CH$_2$—COOH and particularly alkoxy groups containing, for example, 1 to 8 carbon atoms.

Q in the radical —N(Q) represents an aliphatic radical bound through a carbon atom to the nitrogen atom, while X in the Formula 1 represents an aliphatic radical bound through a carbon atom to A, or a naphthalene, or especially benzene, radical bound through a cyclic carbon atom to A. Particularly suitable as aliphatic radicals of this type are alkyl or hydroxyalkyl groups; preferred alkyl groups are the linear of branched alkyl groups containing up to 8 carbon atoms, such as methyl, ethyl, isopropyl, tertiary butyl and n-octyl, and preferred hydroxyalkyl groups are those which contain up to 4 carbon atoms, for example hydroxyethyl and hydroxypropyl.

There may be especially mentioned the new aryl-1:3:5-triazines of the Formula 1 in which at least one of the symbols Y and Z represents a benzene radical containing a hydroxyl group in vicinal position to the direct bond to the triazine ring, and X represents an alkyl or hydroxyalkyl group or a benzene radical bound to A through a cyclic carbon atom or, if A stands for —NH—, it may represent a hydrogen atom. Relevant examples are the aryl-1:3:5-triazines of the formula (2) 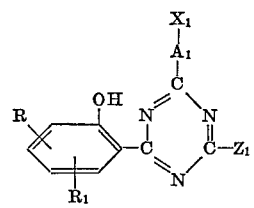

where $A_1$ represents —NH— or a group —N($Q_1$)— (where $Q_1$ stands for an alkyl or hydroxyalkyl group), $X_1$ represents an alkyl or hydroxyalkyl group or a benzene radical bound through a cyclic carbon atom to $A_1$ or, if $A_1$=—NH—, a hydrogen atom; R represents a hydrogen atom, a possibly etherified hydroxyl group or an alkyl group; $R_1$ stands for a hydrogen atom or an alkyl group, and $Z_1$ stands for a chlorine atom or a hydroxybenzene radical of the formula (2a) 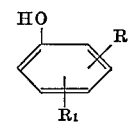

where R and $R_1$ have the above meanings.

From among the new aryl-1:3:5-triazines of the Formulas 1 and 2 there may be especially mentioned, for example, those which correspond to the formula (3) 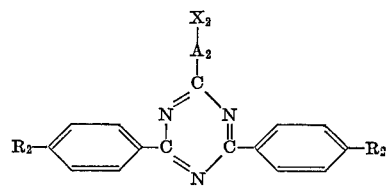

where $A_2$ stands for —NH— or for a group =N—$Q_1$ (where $Q_1$ is an alkyl or hydroxyalkyl), $X_2$ represents an alkyl or hydroxyalkyl group or a phenyl group and $R_2$ a hydrogen atom, a hydroxyl group or an alkoxy group with up to 8 carbon atoms.

The new aryl-1:3:5-triazines of the above general Formula 1 can be manufactured by known methods.

Inter alia, new aryl-1:3:5-triazines of the formula—

(5)

$$\begin{array}{c} X_1 \\ | \\ A_1 \\ \diagup \diagdown \\ C \\ \diagup \diagdown \\ N \quad N \\ | \quad \| \\ Y_1-C \quad C-Z_2 \\ \diagdown \diagup \\ N \end{array}$$

where $A_1$ and $X_1$ have the same meanings as in Formula 2; $Y_1$ represents a naphthalene, or especially benzene, radical bound through a cyclic carbon atom directly to the triazine ring, said radical containing in vicinal position to the bond to the triazine ring hydroxyl group and possibly in para-position to the bond to the triazine ring an alkyl group, a hydroxyl group or an alkoxy group, and $Z_2$ represents a chlorine atom or a naphthalene, or especially benzene, radical $Y_1$—can be manufactured, for example, by condensing a dichloro-1:3:5-triazine of the formula (6)
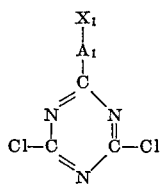

where $X_1$ and $A_1$ have the above meanings—in an anhydrous medium in the presence of a Friedel-Crafts catalyst (especially aluminium chloride) and in an inert organic solvent, with 1 mol or 2 mols of a compound of the naphthalene, or especially benzene, series which, for example like the compounds of the formula (7)
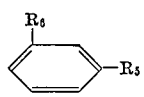

where $R_5$ and $R_6$ each represents a hydroxyl group or an alkoxy group—contains in vicinal position to the resulting bond to the triazine ring a hydroxyl group or alkoxy group and possibly in para-position to the resulting bond to the triazine ring an alkyl, hydroxyl or alkoxy group. The dichloro-1:3:5-triazines of the Formula 6 are either known or can be prepared by usual methods.

For the manufacture of aryl-1:3:5-triazines of the Formula 5 1 mol or 2 mols of a compound of the naphthalene, or especially benzene, series which, like for instance the compounds of the Formula 7, contains in vicinal position to the resulting bond to the triazine ring a hydroxyl or alkoxy group and possibly in para-position to the bond to the triazine ring an alkyl, hydroxyl or alkoxy group, is/are condensed in an anhydrous medium, in the presence of a Friedel-Crafts catalyst (especially aluminium chloride) and in an inert organic solvent, with 1 mol of 2:4:6-trichloro-1:3:5-triazine (generally called cyanuric chloride), and in the resulting dichloro-1:3:5-triazine or monochloro-1:3:5-triazine respectively one of the two chlorine atoms, or the remaining chlorine atom, is replaced in known manner by a radical —$A_1$—$X_1$, for example with ammonia by an $H_2N$-group, with an alkanol by an alkoxy group, with a suitable mercapto compound by a thioether radical or with a corresponding primary or secondary amine by an amine radical.

As examples of compounds that furnish a naphthalene, or especially a benzene, radical which contains a hydroxyl group in vicinal position to the direct bond to the triazine ring, there may be mentioned the following compounds:

2-hydroxynaphthalene,
2-hydroxy-6-chloronaphthalene,
1:3-dihydroxynaphthalene,
1:3-dihydroxybenzene,
1-hydroxy-3-methoxybenzene,
1-hydroxy-3-ethoxybenzene,
1:3-dimethoxybenzene,
1:3-diethoxybenzene,
1:3-dihydroxy-4-methylbenzene,
1-hydroxy-3-methylbenzene and
1-hydroxy-3:4-dimethylbenzene.

New aryl-1:3:5-triazines of the formula (8)
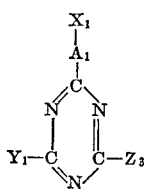

where $A_1$, $X_1$ and $Y_1$ have the same meanings as in Formula 5 and $Z_3$ represents a naphthalene, or especially benzene, radical which is bound by a cyclic carbon atom directly to the triazine ring and is free from hydroxyl groups—are obtained, for example, by replacing by a known method in any desired order of succession, in a dichloro-1:3:5-triazine of the formula (9)
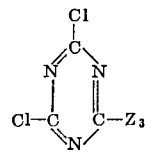

one chlorine atom by a naphthalene, or especially a benzene, radical which contains a hydroxyl group in vicinal position to the direct bond to the triazine ring and possibly in para-position to the bond to the triazine ring an alkyl, hydroxyl or alkoxy group, and one chlorine atom by a radical —$X_1$—$A_1$.

The dichloro-1:3:5-triazine compounds of the Formula 9 are likewise either known or can be prepared by conventional methods.

When the starting material used for the reaction with chloro-1:3:5-triazines in the processes described above is a compound of the benzene series in which both hydroxyl groups in meta-position relatively to each other are etherified—for example compounds of the Formula 7 where $R_5$ and $R_6$ are alkoxy groups—the etherified hydroxyl group in ortho-position to the bond formed with the triazine ring (e.g., $R_6$ in Formula 7) is split during the reaction, especially at an elevated temperature, so that these starting materials likewise give rise to aryl-1:3:5-triazines of the Formula 1.

Aryl-1:3:5-triazines of the Formula 1 that contain hydroxybenzene radicals comprising in ortho-position to the bond to the triazine ring a hydroxyl group and in para-position thereto an etherified hydroxyl group are also obtained when in an aryl-1:3:5-triazine containing hydroxybenzene radicals which carry both in the ortho-position and in the para-position to the bond to the triazine ring an (unetherified) hydroxyl group, the hydroxyl group in para-position is subsequently etherified by a known method, for example with an alkylhalide such as n-propyl bromide, isopropyl-bromide or n-octyl-bromide, with a dialkylsulfate such as diethylsulfate, with a phenylalkyl halide such as benzyl chloride, with an alkenyl halide such as allylbromide or with ethylenechlorohydrin, glycerol-α-chlorohydrin or epichlorohydrin (1-chloro-2:3-epoxypropane) or with chloroacetic acid.

New aryl-1:3:5-triazines of the Formula 1, where X represents a naphthalene, or especially a benzene, radical bound through a cyclic carbon atom to A, which contains a hydroxyl group in vicinal position to the bond to A, and in which both Y and Z each represents a naphthalene, or especially a benzene, radical free from hydroxyl groups, can be manufactured from suitable 2-chloro-4:6-diaryl-1:3:5-triazines and compounds that furnish the radical —A—X, for example as represented by the following scheme of specific formulae:

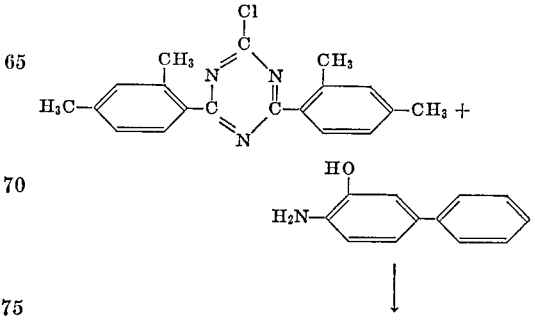

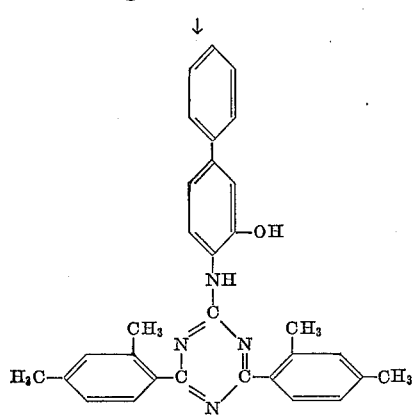

The new aryl-1:3:5-triazines of the composition defined above can be used as stabilisers for a wide variety of organic materials, more especially as ultraviolet filters.

Accordingly, the present invention further includes a process for protecting organic materials from the harmful effects of heat, air and especially ultraviolet rays, with the use of the new aryl-1:3:5-triazines of the Formula 1.

Quite generally, there are three ways in which the new compounds may be used, either separately or in combinations:

(A) The stabiliser, especially the light filter, is incorporated with a substrate to protect it from the light attack by ultraviolet rays, to prevent a change in one or several physical properties, e.g., discoloration, change in tear strength, embrittlement and so on, and/or chemical reactions triggered off by ultraviolet rays, e.g., oxidation processes. The new substance may be incorporated before or during the manufacture of the substrate or subsequently, by a suitable operation, e.g. a fixing process similar to a dyeing process.

(B) The light filter is incorporated with the substrate to protect one or several other substances contained in the substrate, e.g., dyestuffs, assistants etc.; this may be accompanied by the protection of the substrate as mentioned under (A) above.

(C) The light filter is incorporated with a "filter layer" to protect the substrate placed directly underneath it or at some distance from it (e.g., in a shop window) from the attack of ultraviolet rays. The filter layer may be solid (film, foil, dressing) or semi-solid (cream, oil, wax).

Accordingly, the process for protecting organic materials from the harmful effects of heat, air and especially ultraviolet rays is characterised by the fact that new aryl-1:3:5-triazines of the Formula 1 are incorporated with, or fixed on, the organic material to be protected as such or a substrate containing the said material, or a filter layer placed on top of the material to be protected.

As organic materials suitable for such protection there may be mentioned:

(a) Textile materials quite generally, which may be in any desired form, e.g., of fibers, filaments, yarns, woven or knitted fabrics or felts, and all objects manufactured therefrom; such textile materials may consist of: natural materials of animal origin such as wool or silk, or of vegetable origin, such as cellulose materials from cotton, hemp, flax, linen, jute or ramie; also from semi-synthetic materials such as regenerated cellulose, e.g. rayon, viscose rayon, including spun rayon, or synthetic materials obtained by polymerization or copolymerization, e.g., polyacrylonitrile, polyvinyl chloride or polyolefines such as polyethylene and polypropylene, or those which are accessible by polycondensation such as polyesters and above all polyamides. In the case of semi-synthetic materials it is advantageous to add the protective agent to a spinning composition, e.g., viscose spinning composition, acetylcellulose spinning composition (including cellulose triacetate) and, in the case of the manufacture of fully-synthetic materials to the masses, such as polyamide melts or polyacrylonitrile spinning compositions before, during or after the polycondensation or polymerisation respectively.

(b) Fibrous materials of a different kind not being textile materials, which may be of animal origin, such as feathers, hairs, also pelts and hides, and leathers made from the latter by natural or chemical tanning, as well as finished products made therefrom; also those of vegetable origin such as straw, wood, wood pulp or fibrous materials consisting of densified fibers, such as paper, cardboard or hardboard, as well as materials made from the latter. Also in the manufacture of paper pulp used in the manufacture of paper (e.g., hollander pulp).

(c) Coating and dressing agents for textile materials and papers, e.g., those based on starch or casein or on synthetic resins, e.g., obtained from vinyl acetate or derivatives of acrylic acid.

(d) Lacquers and films of diverse composition, e.g., those from acetylcellulose, cellulose propionate, cellulose butyrate or cellulose mixtures, e.g., cellulose acetate/butyrate and cellulose acetate/propionate; also nitrocellulose, vinyl acetate, polyvinyl chloride, polyvinylidene chloride, copolymers from vinyl chloride and vinylidene, chloride, alkyd lacquers, polyethylene, polypropylene, polyamides, polyacrylonitrile, polyesters etc. The new aryl-1:3:5-triazines may also be incorporated with wrapping materials, especially the known transparent foils from regenerated cellulose (viscose) or acetylcellulose. In this connection it is a rule advantageous to add the protective agent to the mass from which these foils are manufactured.

(e) Natural or synthetic resins, e.g., epoxy resins, polyester resins, vinyl resins, polystyrene resins, alkyd resins, aldehyde resins such as condensation products of formaldehyde with phenol, urea or melamine, as well as emulsions from synthetic resins (e.g., oil-in-water or water-in-oil emulsions); the protective agent can advantageously be used before or during the polymerization or polycondensation respectively. Furthermore, there may be mentioned resins reinforced with glass fibers and laminates made therefrom.

(f) Hydrophobic substances containing oil, fat or wax, such as candles, floor polishes, floor stains or other wood stains, furniture polishes, more especially those which are to be used for the treatment of light-colored, possibly bleached wood surfaces.

(g) Natural rubber-like materials such as rubber, balata, gutta percha, or synthetic vulcanisable materials such as polychloroprene, olefinic polysulfides, polybutadiene or copolymers of butadiene+styrene (e.g., Buna S) or butadiene+acrylonitrile (e.g., Buna N) which may further contain fillers, pigments, vulcanisation accelerators etc. and to which the addition of the new aryl-1:3:5-triazine is made to delay the ageing and thus to prevent any change in the plasticity properties and the embrittlement.

(h) Cosmetic preparations, such as perfumes, dyed or undyed soaps and bath salts, skin and face creams, powders, repellants and especially sunburn oils and cream.

It goes without saying that the new aryl-1:3:5-triazines may be used as protective agents not only for undyed but also for dyed or pigmented materials. In such a case the protection extends also to the dyestuffs so that in some cases a very substantial improvement of the fastness to light is simultaneously achieved. If desired, the treatment with the protective agent may be combined with the dyeing or pigmenting process.

Depending on the kind of materials to be treated, the requirements as to efficacy and durability and other factors the amount of stabiliser, or especially the light filter, to be incorporated with the material concerned may vary within rather wide limits, for example from about 0.01 to 10%, preferably from 0.1 to 2%, of the material that is to be protected directly against the harmful effects of heat, air and especially ultraviolet radiation.

Unless otherwise indicated, parts and percentages in the following examples are by weight.

Example 1

8.2 parts of 2-amino-4:6-dichloro-1:3:5-triazine and 11 parts of 1:3-dihydroxybenzene are dissolved in 80 parts of nitrobenzene, and within 15 minutes at 5 to 10° C. 14 parts of anhydrous aluminium chloride are added. The mixture is heated within 30 minutes to 70° C. and stirred on for 4 hours at the same temperature. The dark-red solution is then poured over a mixture of 250 parts of water, 100 parts of ice and 50 parts of concentrated hydrochloric acid. While stirring the batch, the aqueous layer is renewed at 0° C. until it displays a pH value of at least 5. The nitrobenzene phase is then subjected to steam distillation, whereupon the product of the formula

(10) 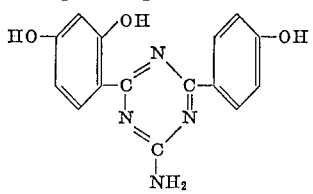

settles out in the form of light-yellow crystals melting above 300° C. Yield: 12 to 13 parts.

After having been recrystallised 4 times from aqueous dimethylformamide, the analytically pure product reveals the following data:

$C_{15}H_{12}O_4N_4$—Calculated: C, 57.69%; H, 3.87%; N, 17.94%. Found: C, 57.33%; H, 4.01%; N, 17.99%.

Example 2

The process of Example 1 performed with 12.05 parts of 2-anilino-4:6-dichloro-1:3:5-triazine instead of with 8.2 parts of 2-amino-4:6-dichloro-1:3:5-triazine yields the product of the formula

(11) 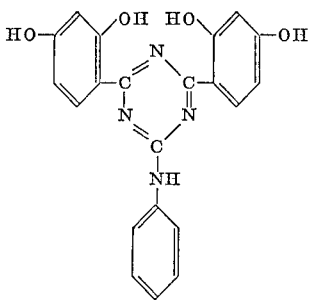

in a similar purity and yield; it melts above 300° C.

$C_{21}H_{16}O_4N_4$—Calculated: C, 64.94%; H, 4.15%; N, 14.43%. Found: C, 65.17%; H, 4.27%; N, 14.75%.

The following compounds can be prepared as described in Example 1:

(12) 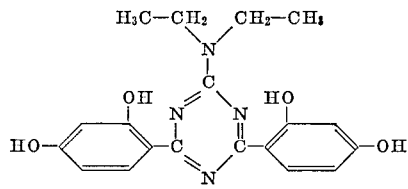

Melting point: 233.5 to 234.5° C.
Analysis.—Calculated: C, 61.94%; H, 5.47%; N, 15.21%. Found: C, 62.04%; H, 5.27%; N, 15.44%.

(14) 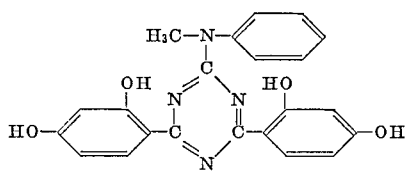

Melting point: 310 to 311° C.

Analysis.—Calculated: C, 65.66%; H, 4.57%; N, 13.92%. Found: C, 65.26%; H, 4.60; N, 13.69%.

(15) 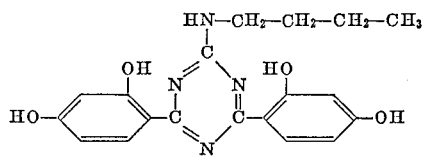

Melting point: 186 to 187° C.
Analysis.—Calculated: C, 61.94%; H, 5.47%; N, 15.21%. Found: C, 61.80%; H, 5.46%; N, 15.08%.

(16) 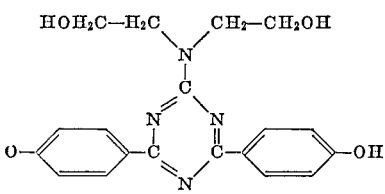

Melting point: 279 to 280° C.
Analysis.—Calculated: C, 56.99%; H, 5.04%; N, 13.99%. Found: C, 57.09%; H, 5.11%; N, 13.68%.

Example 3

6.5 parts of the compound of the formula

(17) 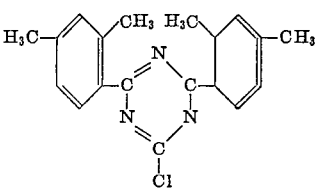

[prepared by condensing 1 mol of cyanuric chloride with 2 mols of 1:3-dimethylbenzene in the presence of aluminium chloride in benzene; melting at 135 to 136° C.] are stirred with 3.3 parts of 1-hydroxy-2-amino-4-tertiary butylbenzene in 60 parts of trichlorobenzene for 3 hours at 170 to 180° C. The batch is then poured over a mixture of 100 parts of ice, 200 parts of water and 30 parts of concentrated hydrochloric acid. The aqueous layer is decanted from the trichlorobenzene layer until the former is neutral, whereupon the trichlorobenzene is removed by steam distillation. The yellowish residue (about 8 parts) is recrystallised from aqueous alcohol.

The analytically pure product of the formula

(18) 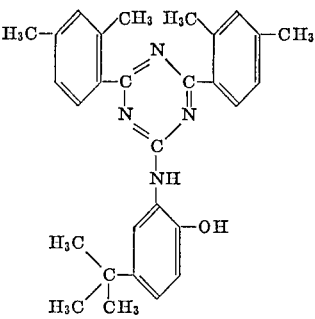

melts at 178 to 179° C. and reveals the following data:
$C_{29}H_{32}ON_4$.—Calculated: C, 76.95%; H, 7.13%; N, 12.3%. Found: C, 76.58%; H, 7.36%; N, 12.36%.

Example 4

When in Example 3 the 3.3 parts of 1-hydroxy-2-amino-4-tertiary butylbenzene are replaced by an equivalent amount of 1-hydroxy-2-amino-4-phenylbenzene, the product of the formula

(19)
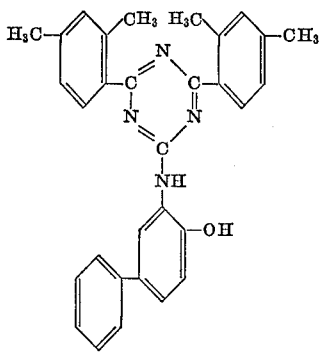

is obtained in a similar purity and yield. It melts at 225 to 226° C.

$C_{31}H_{28}ON_4$.—Calculated: C, 78.79%; H, 5.97%; N, 11.86%. Found: C, 78.90%; H, 5.80%; N, 12.05%.

*Example 5*

When in Example 3 the 3.3 parts of 1-hydroxy-2-amino-4-tertiary butylbenzene are replaced by an equivalent amount of 1-hydroxy-2-amino-4-benzylbenzene, the product of the formula

(20)
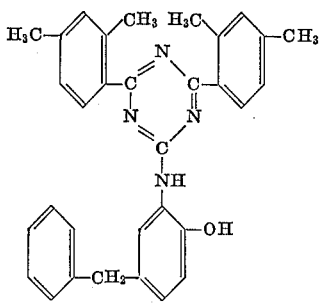

is obtained in a similar purity and yield. It melts at 166 to 167° C.

$C_{32}H_{30}ON_4$.—Calculated: C, 78.98%; H, 6.21%; N, 11.52%. Found: C, 78.89%; H, 6.37%; N, 11.42%.

*Example 6*

6.6 parts of the compound of the formula

(21)
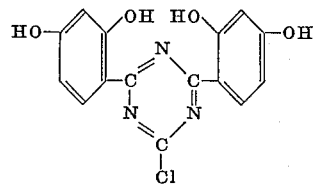

[prepared as described below] are stirred with 5.2 parts of n-octylamine in 70 parts of nitrobenzene for 5 hours at 100 to 110°. The usual working up (cf. Example 3) yields about 8 parts of the compound of the formula

(22)
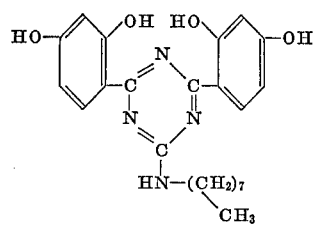

which melts above 330° C.

$C_{23}H_{28}O_4N_4$.—Calculated: C, 65.07%; H, 6.65%; N, 13.20%. Found: C, 65.35%; H, 6.66%; N, 13.07%.

The compound of the Formula 21 can be prepared in the following manner:

93 parts of cyanuric chloride and 60 parts of 1:3-dihydroxybenzene are suspended in 900 parts of benzene. 67 parts of anhydrous aluminium chloride are then added at 15 to 20° C., whereupon a solution is obtained from which a yellow oil rapidly settles out and turns solid after about one hour. The batch is kept for 10 hours at room temperature, the benzene is decanted from the resinous substance, and the residue is mixed with 1000 parts of 10% hydrochloric acid. The yellow crystals are suctioned off and dried at 60 to 70° C. Yield: 75 to 80 parts.

To purify the reaction product, the excess cyanuric chloride is extracted with benzene, and the product of the Formula 21 is recrystallised from aqueous alcohol, whereupon it forms yellow crystals melting above 300° C.

$C_{15}H_{10}O_4N_3Cl$—Calculated: C, 54.31%; H, 3.04%; N, 12.67%. Found: C, 54.53%; H, 2.98%; N, 12.22%.

*Example 9*

1.0 part of the compound of the Formula 10 is dissolved in 100 parts by volume of 3% sodium hydroxide solution and 100 parts by volume of ethanol. 3000 parts of water and 3 parts of an aqueous solution of an adduct of 35 mols of ethylene oxide with 1 mol of stearyl alcohol are then added, and this solution is neutralised with 10% sulfuric acid, while checking with a potentiometer, until a pH value of 7 has been reached, whereupon a fine dispersion forms. 100 parts of a fabric from polyamide fibers (prepared from hexamethylenediamine and adipic acid) are then entered at room temperature into the dispersed bath, the whole is slowly raised to the boil and the fabric is then treated for an hour at this temperature, then taken out of the bath, thoroughly rinsed in cold water and dried.

After having been exposed for 100 hours to a xenon lamp, the fabric treated in this manner displays a much lesser loss in tear strength than when the compound of the Formula 10 has not been added.

Similar good results are achieved when the compound of the Formula 10 is replaced by one of the compounds of Formulae 11, 12, 14, 15, 16, 19, 20 or 22.

*Example 10*

10,000 parts of a polyamide in chip form, prepared from hexamethylenediamine adipate in the known manner, are mixed with 30 parts of titanium dioxide (rutile modification) and 50 parts of the compound of the Formula 10, 11 or 14 in a tumbler for 12 hours. The treated chips are melted in a boiler which is heated with oil to 300 to 310° C. and after the atmospheric oxygen has been displaced from it with superheated steam, and the whole is stirred for ½ hour. The melt is then expressed under nitrogen (5 atmospheres gauge pressure) through a spinneret and the resulting, cooled filament is wound on a spinning bobbin. The tear strength of the resulting filaments after stretching decreases much less under the influence of light than that of filaments manufactured in the same manner but without addition of the compound of the Formula 10, 11, or 14.

*Example 11*

A paste prepared from 100 parts of polyvinyl chloride, 59 parts by volume of dioctyl phthalate and 0.2 part of the compound of the Formula 15 is rolled on a calender at 150 to 155° C. to form a foil. The resulting polyvinyl chloride foil absorbs completely in the ultraviolet region from 280 to 360 mμ.

Instead of the compound of the Formula 15, the compound of the Formula 16 may be used.

*Example 12*

A mixture of 100 parts of polyethylene ("Alkathene WNG 14") and 0.2 part of one of the compounds of Formula 15 or 16 is rolled on a calender at 130 to 140° C. to form a foil and pressed at 130° C.

The resulting polyethylene foil is practically impermeable to ultraviolet light within the region from 280 to 380 mμ.

Similar results are obtained when polyethylene is replaced by polypropylene.

*Example 13*

In a hollander, a paper pulp of the following composition is prepared:

150 parts of bleached sulfite or sulfate cellulose
60 parts of zinc sulfide,
6 parts of aluminium sulfate,
3 parts of a finely dispersed aqueous paste containing 30% of the azo pigment of the formula

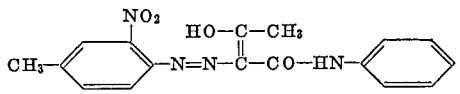

5000 parts of water.

The decorative paper made from this paste is immersed, together with untreated tissue or overlay paper, in a bath prepared from 100 parts of a pulverulent, curable, water-soluble condensate from 1 mol of melamine and about 2 mols of formaldehyde, and
100 parts of a mixture prepared from a solution of 0.5 part of the compound of the Formulas 10 to 16, 18 to 20 or 22 in 19.5 parts of dimethylformamide by diluting with 80 parts of water.

After having removed the excess resin solution, the papers are dried.

The decorative paper treated in this manner, together with the treated tissue paper used as cover sheet, is placed on a support consisting of a layer of phenol paper and blocking sheets impregnated with melamine resin as interlays and the sandwich is pressed for 10 minutes at 140 to 150° C. under a pressure of 100 kg. per cm.²

After exposure in a fadeometer the treated laminate displays much better fastness to light than a laminate that does not contain the compound of the Formula 10, 11, 12, 15, 16, 18, 19, 20 or 22.

What is claimed is:
1. An aryl-1:3:5-triazine of the formula

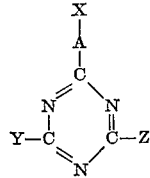

where A is selected from the group consisting of

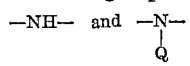

(in which Q is an aliphatic radical bound through a carbon atom to the nitrogen atom), X is selected from the group consisting of (1) an aliphatic radical bound through a carbon atom to A, (2) a naphthalene radical bound through a cyclic carbon atom to A, (3) a benzene radical bound through a cyclic carbon atom to A and (4) if A=—NH—, a hydrogen atom, Y stands for a member selected from the group consisting of a naphthalene and benzene radical bound through a cyclic carbon atom to the triazine ring, Z is a member selected from the group consisting of halogen and Y, with the proviso that at least one of the symbols X, Y and Z represents a member selected from the group consisting of a naphthalene and benzene radical which contains a hydroxyl group in vicinal position to a member selected from the group consisting of the bond to A and the bond to the triazine ring.

2. An aryl-1:3:5-triazine of the formula

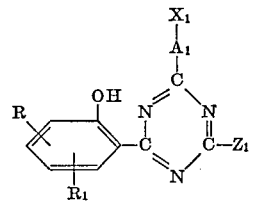

where $A_1$ stands for a member selected from the group consisting of

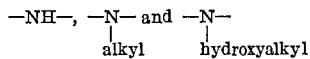

$X_1$ is selected from the group consisting of (1) alkyl, (2) hydroxyalkyl, (3) a benzene radical bound through a cyclic carbon atom to $A_1$ and (H) if $A_1$=—NH—, a hydrogen atom, R represents a member selected from the group consisting of hydrogen, hydroxyl and etherified hydroxyl having from 1 to 8 carbon atoms, $R_1$ stands for a member selected from the group consisting of hydrogen and lower alkyl, and $Z_1$ is selected from the group consisting of chlorine and a hydroxybenzene radical of the formula

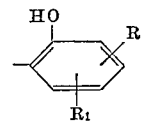

where R and $R_1$ have the above meanings.

3. An aryl-1:3:5-triazine of the formula

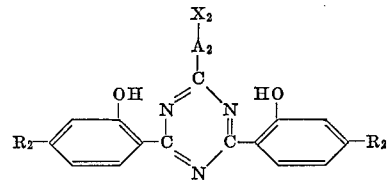

where $A_2$ is a member selected from the group consisting of

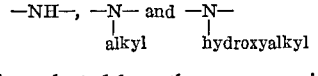

$X_2$ is a member selected from the group consisting of alkyl, hydroxyalkyl and phenyl, and $R_2$ is a member selected from the group consisting of hydrogen, hydroxyl and alkoxy with up to 8 carbon atoms.

References Cited by the Examiner
UNITED STATES PATENTS

| | | | |
|---|---|---|---|
| 1,549,901 | 8/1925 | Bonhote | 260—249.5 |
| 1,551,095 | 8/1925 | Fritzsche et al. | 260—248 |
| 2,950,196 | 8/1960 | Carroll et al. | 260—249.5 |
| 3,113,943 | 12/1963 | Johns et al. | 260—248 |
| 3,118,887 | 1/1964 | Hardy et al. | 260—248 |
| 3,119,823 | 1/1964 | Shapiro et al. | 260—249.9 |

FOREIGN PATENTS 691,520   5/1953   Great Britain.

WALTER A. MODANCE, *Primary Examiner.*

NICHOLAS S. RIZZO, *Examiner.*

M. W. WESTERN, J. M. FORD, *Assistant Examiners.*

Notice of Adverse Decision in Interference

In Interference No. 97,117 involving Patent No. 3,270,016, M. Duennenberger, H. R. Biland and C. Luethi, ARYL-1,3,5-TRIAZINES, final judgment adverse to the patentees was rendered Feb. 11, 1972, as to claims 1, 2 and 3.

[*Official Gazette July 4, 1972.*]

Disclaimer 3,270,016.—*Max Duennenberger*, Frenkendorf, Basel-Land, *Hans Rudolf Biland*, Basel, and *Christian Luethi*, Munchenstein, Switzerland. NEW ARYL-1,3,5-TRIAZINES. Patent dated Aug. 30, 1966. Disclaimer filed Apr. 11, 1972, by the inventors; the assignee, *Ciba-Geigy AG*, assenting.

Hereby enters this disclaimer to claims 1–3 (all of the claims) of said patent.

[*Official Gazette November 14, 1972.*]